United States Patent
Lebel et al.

(10) Patent No.: US 9,943,127 B2
(45) Date of Patent: Apr. 17, 2018

(54) ADJUSTABLE CONNECTOR FOR A HELMET ACCESSORY

(71) Applicant: Revision Military S.a.r.L., Luxembourg (LU)

(72) Inventors: Stéphane Lebel, St. Redempteur (CA); David Lefebvre, Gatineau (CA); David Redpath, Beaconsfield (CA); Curtis Herman, Montreal (CA); Lindsay Faye Slater, Montreal (CA)

(73) Assignee: Revision Military S.a.r.L., Luxembourg (LU)

( * ) Notice: Subject to any disclaimer, the term of this patent is extended or adjusted under 35 U.S.C. 154(b) by 66 days.

(21) Appl. No.: 14/955,002

(22) Filed: Nov. 30, 2015

(65) Prior Publication Data

US 2017/0150766 A1 Jun. 1, 2017

(51) Int. Cl.
*A42B 1/24* (2006.01)
*A42B 3/04* (2006.01)
*F16M 13/04* (2006.01)
*A45F 5/02* (2006.01)
*F16C 11/10* (2006.01)

(52) U.S. Cl.
CPC ............... *A42B 3/042* (2013.01); *A45F 5/02* (2013.01); *F16C 11/106* (2013.01); *F16M 13/04* (2013.01); *A45F 2005/027* (2013.01); *A45F 2005/028* (2013.01); *A45F 2200/0533* (2013.01); *F16M 2200/022* (2013.01); *F16M 2200/027* (2013.01)

(58) Field of Classification Search
CPC ...... A42B 3/042; A45F 5/02; A45F 2005/027; A45F 2005/028; F16C 11/106; F16M 13/04; F16M 2200/022; F16M 2200/027

USPC ............ 248/466, 476, 480, 481, 900; 2/422; 74/500.5; 359/877

See application file for complete search history.

(56) References Cited

U.S. PATENT DOCUMENTS

| | | | |
|---|---|---|---|
| 2,442,736 A * | 6/1948 | Valentine | F16M 11/14 248/124.2 |
| 3,461,463 A | 8/1969 | Beguin | |
| 3,889,190 A | 6/1975 | Palmer | |
| 4,490,012 A * | 12/1984 | Magiske | A42B 1/24 248/466 |
| 4,798,454 A * | 1/1989 | Hyun | G02C 9/02 351/158 |
| 4,974,954 A * | 12/1990 | Muller | G02C 9/02 351/50 |
| 5,076,701 A * | 12/1991 | Greenlaw | A42B 3/0426 359/871 |
| 5,331,459 A | 7/1994 | Dor | |
| 5,331,684 A | 7/1994 | Baril et al. | |
| 5,416,922 A | 5/1995 | Horvat et al. | |

(Continued)

FOREIGN PATENT DOCUMENTS

WO   WO 2010/045141 A1   4/2010

*Primary Examiner* — Gwendolyn W Baxter
(74) *Attorney, Agent, or Firm* — Wolf, Greenfield & Sacks, P.C.

(57) ABSTRACT

Connectors for adjusting the location and/or orientation of a helmet accessory relative to a helmet are disclosed. In some embodiments, a connector may have a single lock and/or a single actuator that a user uses to selectively restrict or permit adjustment of the helmet accessory in multiple directions, including translating and/or rotating the helmet accessory relative to the helmet along one or more axes of translation and/or rotation.

24 Claims, 7 Drawing Sheets

(56) References Cited

U.S. PATENT DOCUMENTS

| | | | |
|---|---|---|---|
| 5,467,479 A | 11/1995 | Mattes | |
| 5,471,678 A | 12/1995 | Dor | |
| 5,506,730 A | 4/1996 | Morley et al. | |
| 5,581,806 A | 12/1996 | Capdepuy et al. | |
| 6,016,160 A | 1/2000 | Coombs et al. | |
| 6,052,832 A | 4/2000 | Crompton | |
| 6,472,776 B1 | 10/2002 | Soto | |
| 6,662,370 B1 | 12/2003 | Buchanan | |
| 7,028,961 B1 | 4/2006 | Dittmer et al. | |
| 7,063,427 B1 * | 6/2006 | Cutler | A01M 31/00 359/872 |
| 7,219,370 B1 | 5/2007 | Teetzel et al. | |
| 7,546,994 B2 | 6/2009 | Altonji et al. | |
| 8,120,857 B2 | 2/2012 | Hedges et al. | |
| 8,166,575 B2 | 5/2012 | Haselmayer | |
| 8,209,780 B1 | 7/2012 | Lernire | |
| 8,506,100 B2 * | 8/2013 | Prendamano | A42B 1/242 359/879 |
| 9,033,726 B2 | 5/2015 | Bandy et al. | |
| 9,116,355 B2 | 8/2015 | Teetzel et al. | |
| 2002/0120979 A1 | 9/2002 | Prendergast | |
| 2002/0148032 A1 | 10/2002 | Basson et al. | |
| 2004/0181855 A1 | 9/2004 | Prendergast | |
| 2004/0244099 A1 | 12/2004 | Prendergast | |
| 2006/0007562 A1 | 1/2006 | Willey et al. | |
| 2006/0022102 A1 | 2/2006 | Dittmer | |
| 2006/0037125 A1 | 2/2006 | McDowell | |
| 2006/0048286 A1 | 3/2006 | Donato | |
| 2006/0143764 A1 | 7/2006 | Reed et al. | |
| 2006/0174401 A1 | 8/2006 | Prendergast | |
| 2007/0012830 A1 | 1/2007 | Prendergast | |
| 2007/0067894 A1 | 3/2007 | Bourree et al. | |
| 2007/0114252 A1 | 5/2007 | Gruebel et al. | |
| 2008/0170838 A1 | 7/2008 | Teetzel et al. | |
| 2008/0263752 A1 | 10/2008 | Solinsky et al. | |
| 2008/0272868 A1 | 11/2008 | Prendergast et al. | |
| 2009/0059063 A1 | 3/2009 | Gallagher | |
| 2009/0133178 A1 | 5/2009 | Aguero et al. | |
| 2009/0133179 A1 | 5/2009 | Aguero et al. | |
| 2010/0083413 A1 | 4/2010 | McGovern | |
| 2010/0123961 A1 | 5/2010 | Bauer | |
| 2010/0175172 A1 | 7/2010 | Dempsey et al. | |
| 2010/0180364 A1 | 7/2010 | Willey et al. | |
| 2010/0299814 A1 | 12/2010 | Celona et al. | |
| 2010/0320341 A1 | 12/2010 | Baumann et al. | |
| 2011/0015647 A1 | 1/2011 | Salisbury et al. | |
| 2011/0051273 A1 | 3/2011 | Tronvig | |
| 2011/0099695 A1 | 5/2011 | Siviter | |
| 2011/0145981 A1 | 6/2011 | Teetzel et al. | |
| 2011/0239354 A1 | 10/2011 | Celona et al. | |
| 2011/0289661 A1 | 12/2011 | Hammond | |
| 2011/0314594 A1 | 12/2011 | Rogers et al. | |
| 2012/0002046 A1 | 1/2012 | Rapoport et al. | |
| 2012/0120482 A1 | 5/2012 | Hedges et al. | |
| 2012/0317706 A1 | 12/2012 | Lebel et al. | |
| 2014/0000013 A1 | 1/2014 | Redpath et al. | |
| 2014/0000014 A1 | 1/2014 | Redpath et al. | |

* cited by examiner

ADJUSTABLE CONNECTOR FOR A HELMET ACCESSORY

FIELD

Disclosed embodiments relate to connectors which allow adjustment of a helmet accessory's position relative to a helmet.

BACKGROUND

Protective helmets are commonly worn by first responders, military and law enforcement personnel, and others to protect the head and face from various types of injuries.

Helmet-mounted display units are used to present visual information to a user, typically in the form of an electronic display screen mounted in front of one eye. The display screen may show data, images, video, or any other suitable visual information.

SUMMARY

According to one embodiment, a connector which permits adjustment of a helmet accessory relative to a helmet includes a first attachment portion to attach the connector to a helmet, a second attachment portion to attach the connector to a helmet accessory, and an extendable arm that permits translation of the second attachment portion relative to the first attachment portion. The second attachment portion is rotatable around at least two axes of rotation relative to the extendable arm. The connector has a locked configuration and an unlocked configuration. When the connector is in the locked configuration, translation of the second attachment portion relative to the first attachment portion is substantially prevented. Changing the connector from the locked configuration to the unlocked configuration permits translation of the second attachment portion relative to the first attachment portion. In some embodiments, the first attachment portion is rotatable, the second attachment is rotatable, and when the connector is in the locked configuration, rotation of the first and second attachment portions is prevented, and translation of the second attachment portion relative to the first attachment portion is prevented.

According to another embodiment, a connector which permits adjustment of a helmet accessory relative to a helmet includes a first attachment portion to attach the connector to a helmet, a second attachment portion to attach the connector to a helmet accessory, and an extendable arm coupled to the first attachment portion and the second attachment portion. The extendable arm is constructed and arranged to permit translation of the second attachment portion relative to the first attachment portion. The connector further includes a first joint coupled to the first attachment portion, and a second joint coupled to the second attachment portion. The first joint permits rotation of the extendable arm relative to the first attachment portion around at least two axes of rotation, and second joint permits rotation of the second attachment portion relative to the extendable arm around at least two axes of rotation.

According to a further embodiment, a connector which permits adjustment of a helmet accessory relative to a helmet includes a first attachment portion to attach the connector to a helmet and a second attachment portion to attach the connector to a helmet accessory. The connector further includes a means for adjusting the position of the second attachment portion relative to the first attachment portion and a means for selectively permitting adjustment of the position of the second attachment portion relative to the first attachment portion.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Applicant has recognized that connectors which attach helmet accessories to a helmet often do not provide a user with much flexibility for positioning and orienting an accessory. Additionally, connectors that do provide flexibility typically require a user to interact with multiple separate locking mechanisms to permit desired rotation adjustment of the helmet accessory relative to the helmet. For example, a conventional connector that attaches a helmet-mounted display unit to a helmet may have multiple locking mechanisms which a user may have to separately interact with to be able to rotate the helmet-mounted display about different axes relative to the helmet and subsequently secure the helmet-mounted display in a desired position.

Applicant has achieved numerous benefits by providing a connector that has multiple degrees of freedom, but fewer locking mechanisms than the number of degrees of freedom. For example, in some embodiments, a connector may have a single lock which a user uses to selectively restrict or permit adjustment of the helmet accessory in multiple directions. The lock may be movable to a locking position such that the connector is placed in to a locked configuration in which movement of the helmet accessory relative to the helmet is substantially prevented. The lock may also be movable to an unlocking position such that the connector is placed into an unlocked configuration in which the connector may allow a user to freely adjust the position of the helmet accessory. Adjusting the position of the helmet accessory may include translating and/or rotating the helmet accessory relative to the helmet along one or more axes of translation and/or rotation.

According to certain embodiments described herein, a connector may include a first attachment portion to attach the connector to a helmet and a second attachment portion to attach a helmet accessory to the connector. In such embodiments, adjusting the position of the helmet accessory relative to the helmet may include adjusting the position of the second attachment portion relative to the first attachment portion. In some instances, the first and/or second attachment portions may provide removable attachment between the connector and the helmet or between the connector and the helmet accessory, respectively. Alternatively, the first and/or second attachment portions may not provide removable attachment. For example, in some embodiments, a helmet accessory may be integrally formed with the second attachment portion. Accordingly, it should be understood that the present disclosure is not necessarily limited to any particular structures or configurations for attaching the connector to the helmet and/or attaching the helmet accessory to the connector.

Depending on the particular embodiment, a connector may include one or more joints such that the connector may be adjusted along one or more directions of translation and/or around one or more axes of rotation. For example, the connector may include an extendable arm coupled to the helmet and the helmet accessory (e.g., by first and second attachment portions), and the connector may be arranged so that extension and retraction of the extendable arm permits linear translation of the helmet accessory relative to the helmet. Further, the connector may include rotational joints to allow rotation of the connector components around at least two axes of rotation.

As used herein, two axes of rotation means two different, non-parallel axes, though it should be understood that the two axes do not necessarily have to be perpendicular or transverse to one another. For example, two different rotational axes could be skew to one another. In some embodiments, the one or more rotational joints may be ball and socket joints that have three rotational degrees of freedom and therefore allow for rotation around a nearly infinite number of different rotational axes.

As described above, a connector may be placed into a locked configuration in which movement of the connector is substantially prevented, and an unlocked configuration in which the movement of the connector is permitted. In some embodiments, moving the connector to the locked configuration position applies a compressive force to one or more connector components. Such a compressive force may to provide a frictional engagement between the connector components to limit or prevent relative movement of the connector components. When the connector is changed to the unlocked configuration, the compressive force may be reduced to release or reduce the frictional engagement and permit movement of the connector components for adjusting the helmet accessory position.

While a locking mechanism that relies on frictional engagement is described above, it should be understood that other locks may be suitable as the current disclosure is not so limited. For example, a joint may include a passageway into which a bolt is movable to lock the joint against movement and/or rotations.

In some embodiments, the connector may have an actuator that is movable between a locking position and an unlocking position, and moving the actuator between these positions may allow a user to move the connector between the locked and unlocked configurations, respectively. For example, the actuator may be a thumb screw or a lever, and the actuator may be arranged so that tightening or loosening the actuator moves the connector between the locked configuration and the unlocked configuration, respectively. Accordingly, a user may loosen the actuator, adjust the position of a helmet accessory as desired, and subsequently tighten the actuator to lock the accessory in the desired position. Further, the actuator may include one or more intermediate positions between the locking and unlocking positions. In the intermediate position(s), the connector may provide a reduced frictional engagement of the connector components to allow for limited movement of the connector to fine tune the position of the helmet accessory. However, it should be understood that the actuator may not have any intermediate positions in some embodiments, as the disclosure is not so limited.

By combining two rotational joints with an extendable arm, an accessory such as a display screen can be moved to any location and rotational orientation within certain boundaries. And by allowing locking and unlocking of the connector with a single actuator, a user can easily adjust the accessory's location and orientation and lock the accessory in place.

Turning now to the figures, specific embodiments of connectors for adjustably connecting a helmet accessory to a helmet are described in more detail. For the sake of clarity, certain features are described with regard to a particular embodiment. However, it should be understood that the various features and embodiments depicted in the figures and described herein may be combined in any appropriate fashion as the disclosure is not so limited.

Figure 1:
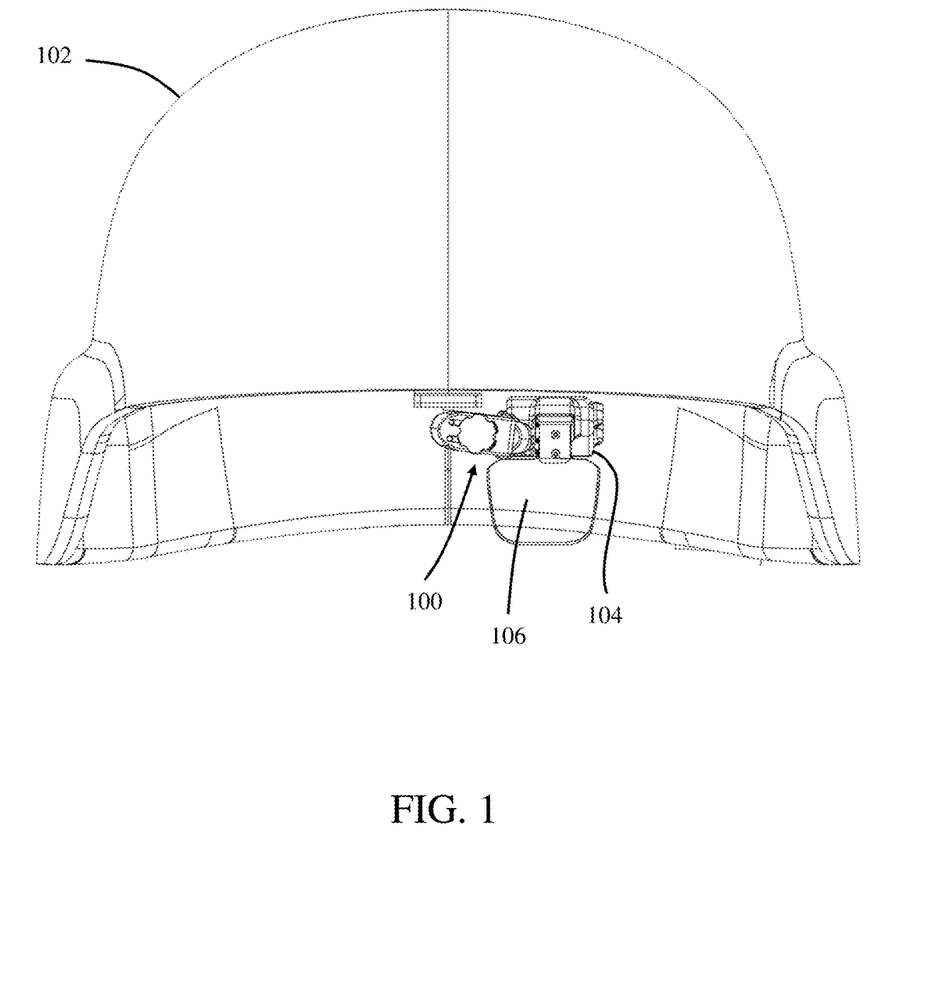
FIG. 1 shows a helmet-mounted display unit attached to a helmet with an adjustable connector according to one embodiment.

One embodiment of an adjustable connector 100 attached to a helmet 102 is shown in FIG. 1. The connector 100 adjustably connects a helmet accessory to the helmet; in the depicted embodiment, the helmet accessory is a helmet-mounted display unit 104 with a display screen 106, though it should be understood that other suitable accessories also may be attached to the helmet 102 with the connector 100. Although the display screen 106 is shown mounted to be in front of a user's left eye, the display screen may instead be mounted to be in front of the user's right eye. Accordingly, the helmet-mounted display unit 104 may include attachment portions on either side for attaching the helmet-mounted display unit to the connector 100.

Figure 2:
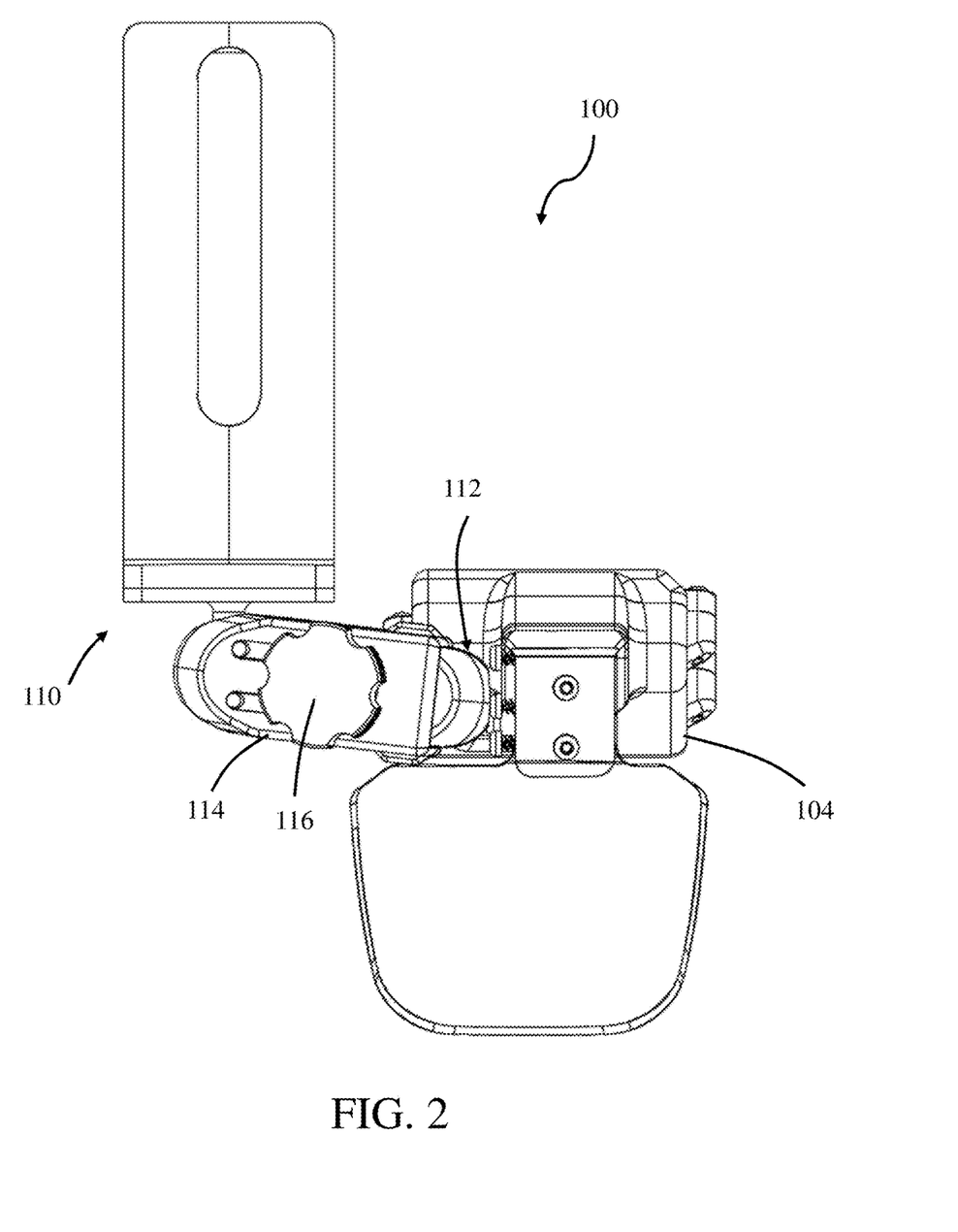
FIG. 2 is a front view of an adjustable connector according to one embodiment.

FIG. 2 is a front view of the connector 100 of FIG. 1. The connector includes a first attachment portion 110 for attaching the connector to the helmet 102, and a second attachment portion 112 to which the helmet-mounted display 104 is attached. An extendible arm 114 is attached to each of the first attachment portion 110 and the second attachment portion 114. As described in more detail below, the connector 100 also includes a locking screw 116 to move the connector between a locked configuration and an unlocked configuration.

Figure 3:
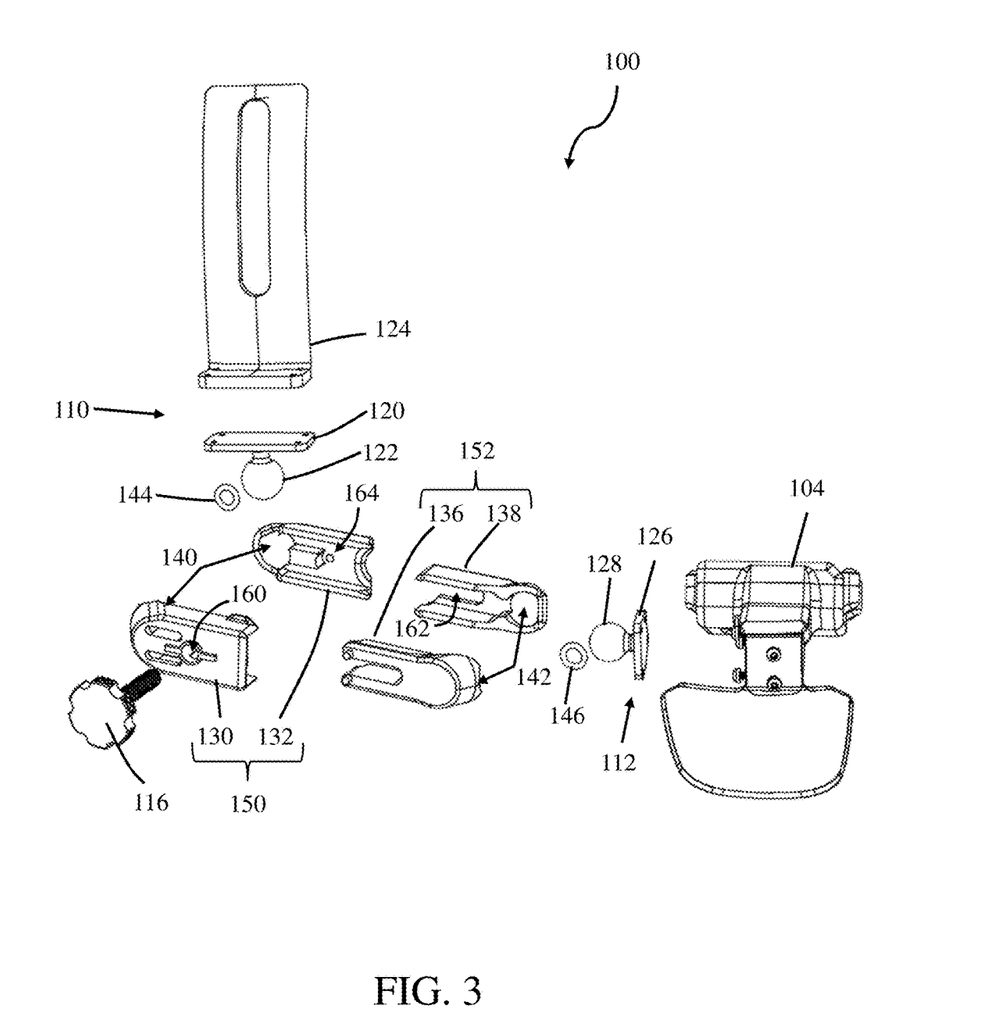
FIG. 3 is an exploded view of the connector of FIG. 2.

FIG. 3 is an exploded view of connector 100. The first attachment portion includes an attachment plate 120 that attaches to a bracket 124, which is attachable to the helmet 102. A ball 122 extends from the plate 120 and attaches to the extendable arm 114 via a socket 140. As illustrated in FIG. 1, when the bracket 124 is attached to the helmet, the plate may be positioned adjacent to a brim of the helmet such that the ball extends downwardly from the brim. The second attachment portion includes a second attachment plate 126 for attachment to the helmet-mounted display 104. A second ball 128 extends from the plate 126 and attaches to the extendable arm 114 via a second socket 142. Accordingly, each of the first attachment portion 110 and second attachment portion 114 are connected to the extendable arm 114 by a ball and socket joint that permits rotational movement of the extendable arm 114 and/or the helmet-mounted display 104 about multiple axes.

The extendable arm 114 includes a first arm portion 150 and a second arm portion 152. The second arm portion is slidable relative to the first arm portion to allow for extension and/or retraction of the extendable arm, which permits translational movement of the second attachment portion 112 relative to the first attachment portion 110. In particular, the second arm portion 152 is received in a channel in the first arm portion 150, and the second arm portion can slide within the channel to allow for extension and/or retraction of the extendable arm 114. As illustrated, the first arm portion 150 includes a front outer portion 130 and a back outer portion 132, and the second arm portion 152 includes a front inner portion 136 and a back inner portion 138.

As noted above, the connector 100 also includes a locking screw 116 that allows a user to selectively lock and unlock the connector. In particular, the locking screw allows a user to move the connector from a locked configuration in which movement of a helmet accessory (e.g., helmet-mounted display 104) is substantially prevented, to an unlocked configuration in which a user may move the accessory to a desired location and/or orientation. In the depicted embodiment, the locking screw 116 is received through a through hole 160 in the front outer portion 130, a channel 162 in each of the front inner portion 136 and back inner portion 138, and into a threaded receiving hole 164 located on the back outer portion 132 of the extendable arm. Tightening the locking screw 116 to move the connector to the locked configuration pulls the back outer portion 132 toward the front outer portion 130 to create a compressive force between the first arm portion 150 and the second arm portion 152. The compressive force provides a frictional engagement which substantially prevents translation of the second arm portion relative to the first arm portion. Additionally, the compressive force provides a frictional engagement between the sockets 140 and 142 and the balls 122 and 128, respectively. In this manner, tightening the locking screw 116 also substantially prevents rotation of ball and socket joints.

In certain embodiments, O-rings 144 and 146 may be included in the sockets 140 and 142 to enhance the frictional engagement between the sockets and the balls for preventing rotational movement. However, it should be understood that the O-rings may not be included in some embodiments, and the frictional engagement between the sockets and the balls may be sufficient without the O-rings to lock the ball joints in a desired rotational position. Further, although a locking screw is described above, other locking mechanisms also may be suitable for providing a compressive force in a connector; for example, a connector may include a lever, a latch, or a clasp to lock the connector.

With such an embodiment, a user can selectively lock and unlock all of the degrees of freedom of the connector with a single actuator (e.g., locking screw 116). Or, in some embodiments, a single actuator can be used to lock and unlock two or more joints that have at least one rotational axis. In some embodiments two or more actuators may be used to lock and unlock three or more rotational and/or translational axes. For example, a similar arrangement to the arrangement described above with relation to FIGS. 1-3 may be used to lock movement of the two ball joints, and a second actuator may be used to prevent linear movement of the extendable arm. The second actuator may be a separate locking screw or pin that is movable into any one of several holes provided in the front portion of the extendable arm, and into a hole in the back portion of the extendable arm, thereby preventing linear movement. In this manner, the user can lock rotational movement of the two ball joints with a single actuator, yet still allow linear translation.

Although ball joints are described above that allow rotation about a nearly infinite number of axes, it should be understood that a connector may have joints that allow rotation about only one axis, or only two axes, or only three axes. For example, in some embodiments, a connector may include one or more revolute joints that each allow rotation around a single axis (i.e., each joint has one rotational degree of freedom). In other embodiments, a connector may include one or more universal joints that have two rotational degrees of freedom. In further embodiments, a connector may include multiple types of joints having different numbers of rotational degrees of freedom. For example, a joint may have a revolute joint at the first attachment portion 110 and a ball joint at the second attachment portion 112. Accordingly, it should be understood that the current disclosure is not necessarily limited to the types of joints used to allow for rotational adjustment of the connector, or to the number of rotational degrees of freedom of each joint.

Figure 4:
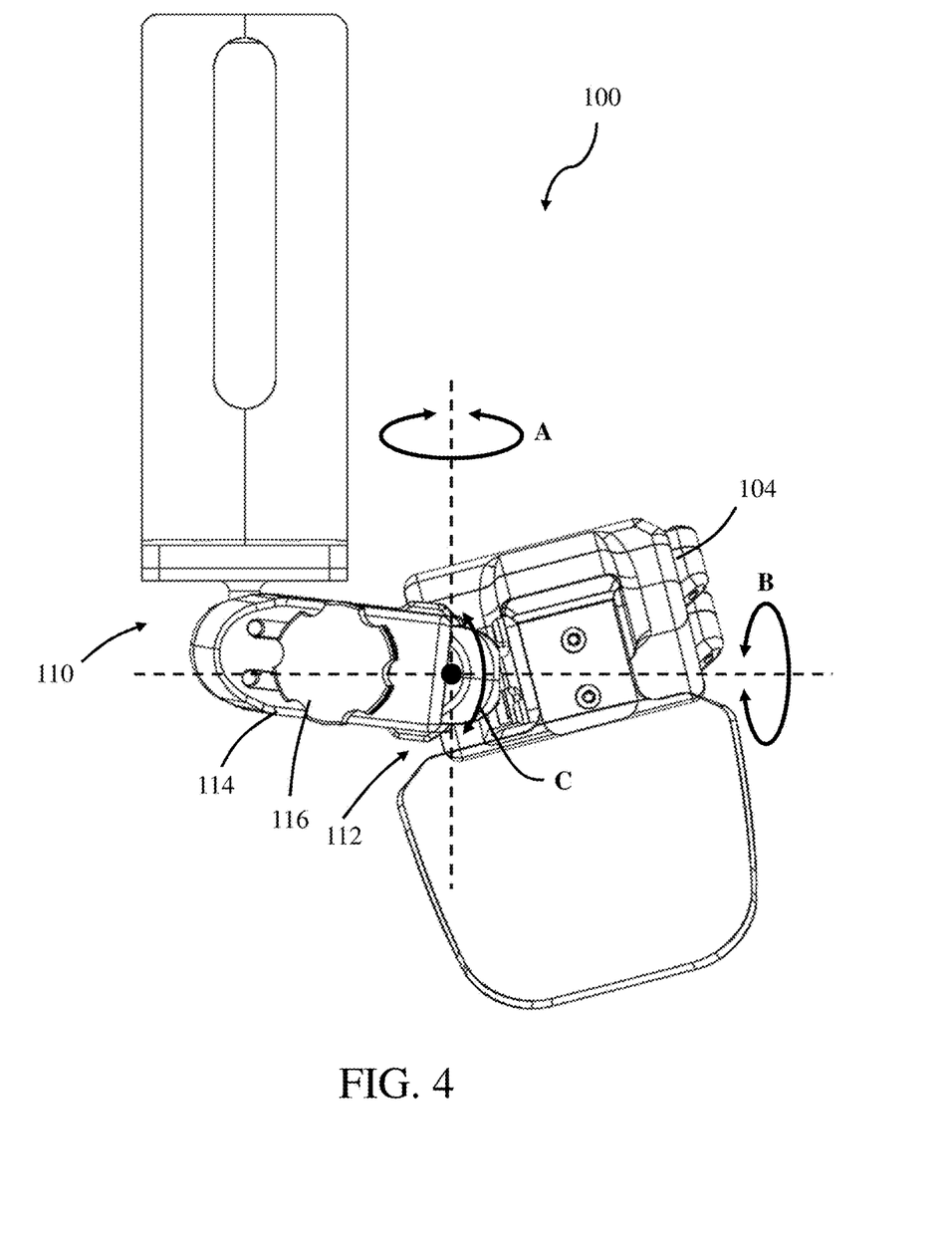
FIG. 4 is a front view of the connector of FIG. 2 adjusted to a different position.
Figure 5:
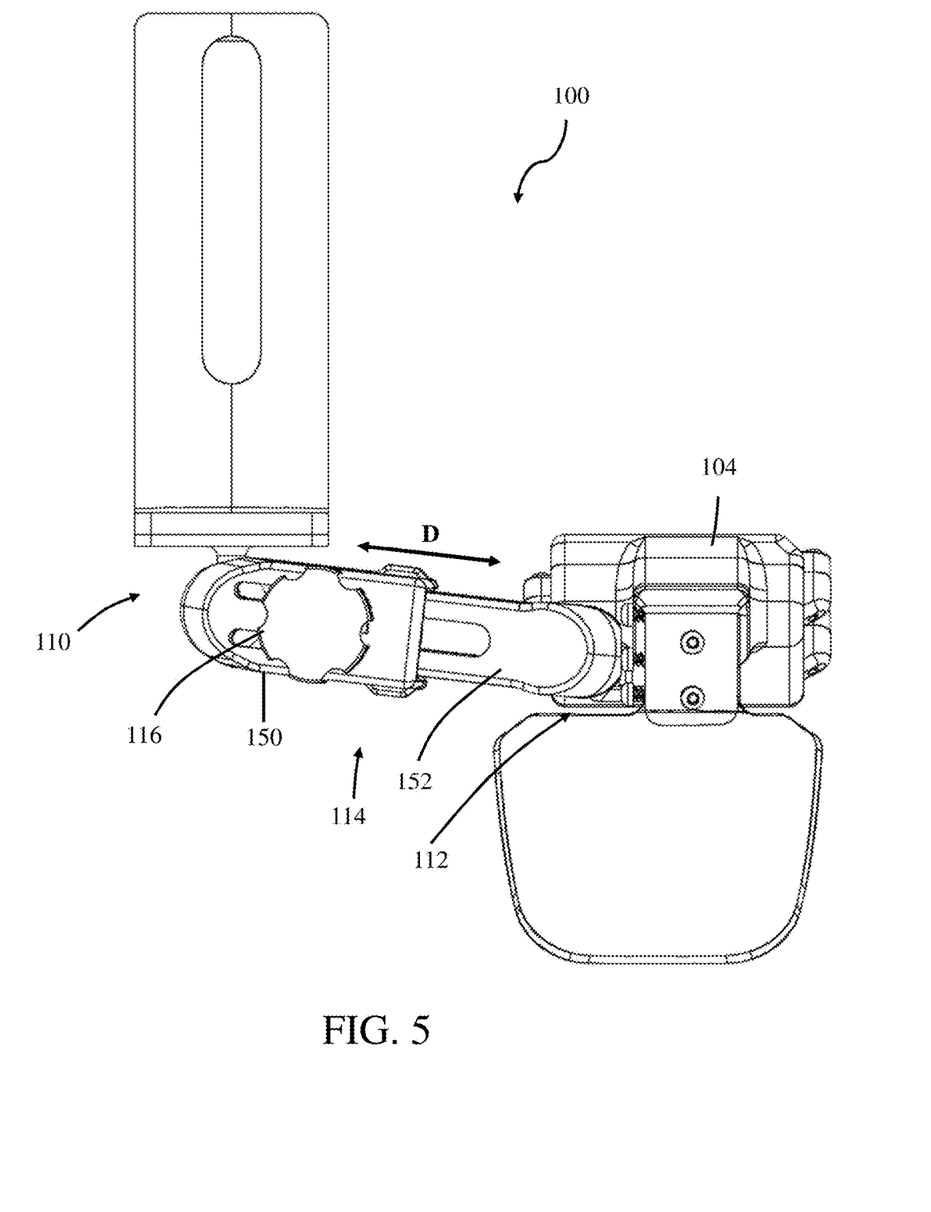
FIG. 5 is a front view of the connector of FIG. 2 adjusted to another different position.
Figure 6:
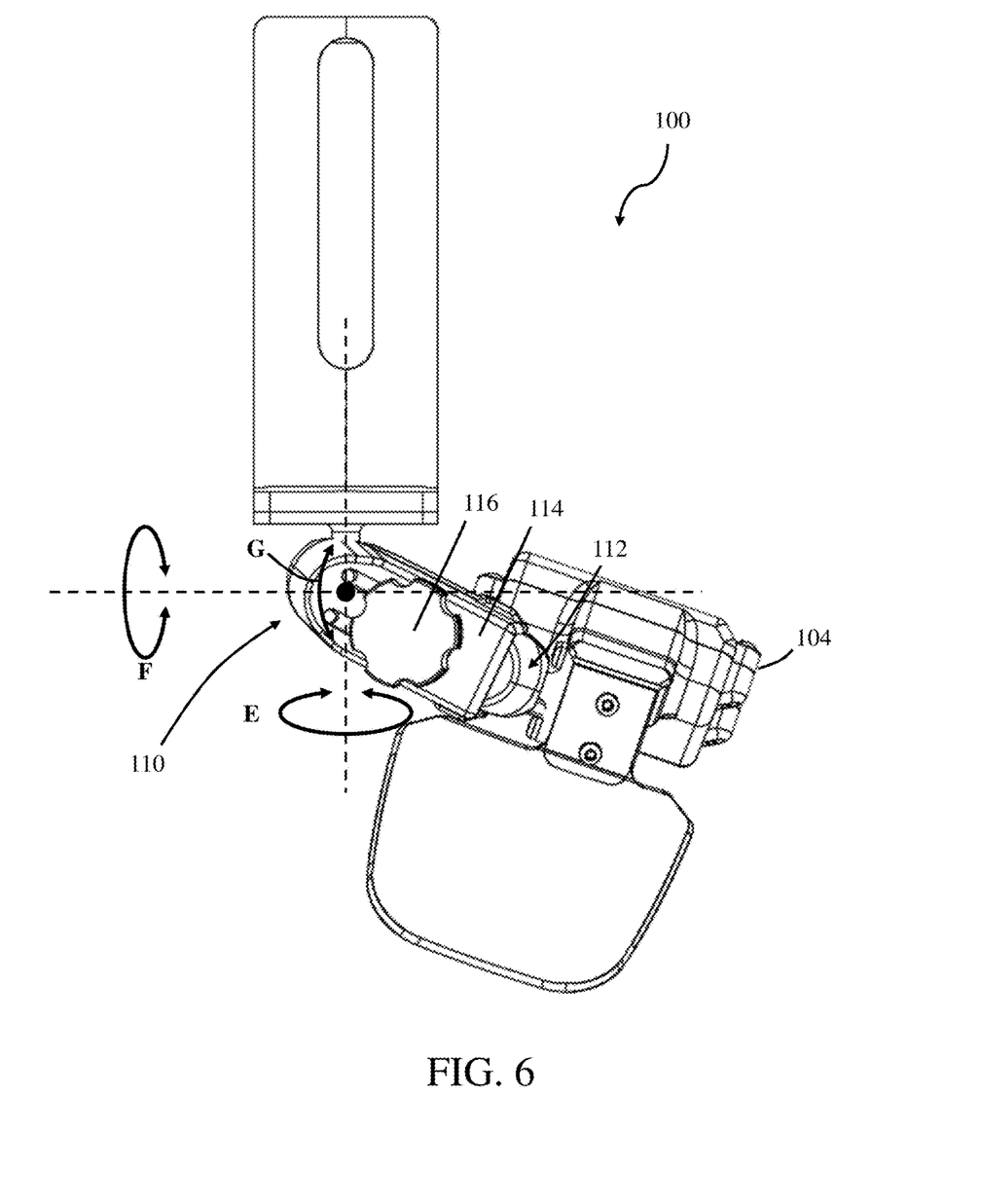
FIG. 6 is a front view of the connector of FIG. 2 adjusted to a yet another different position.

FIGS. 4-6 depict various location and orientation adjustments that may be performed when connector 100 is in the unlocking configuration to allow a user to move the helmet-mounted display 104 (or other helmet accessory) to a desired location and/or orientation. FIG. 4 illustrates the rotational adjustability provided by the ball joint at the second attachment portion 112. In particular, the ball joint has three rotational degrees of freedom to allow for rotational adjustment of the second attachment portion 112 relative to the extendable arm 114. For example, the second attachment portion may be rotated along directions A, B, and/or C relative to the extendable arm; as illustrated, these rotations are about mutually orthogonal axes. As discussed above, helmet mounted display 104 is attached to the second attachment portion 112. Accordingly, rotational adjustment of the second attachment portion relative to the extendable arm 114 allows a user to move the helmet-mounted display 104 to a desired orientation.

FIG. 5 depicts the translational adjustment provided by the extendable arm 114. In particular, the second arm portion 152 is slidable along direction D relative to the first arm portion 150.

FIG. 6 illustrates the rotational adjustment provided by the ball joint at the first attachment portion 110. For example, the extendable arm 114 may be rotated along directions E, F, and/or G relative to the first attachment portion, and thus relative to the helmet; in this manner, adjustment of the ball joint at the first attachment portion 110 may allow the user to change the translation direction of the extendable arm to allow the arm to extend or retract to a desired position. Accordingly, through an appropriate combination of rotations of the ball joints at the first and second attachment portions 110 and 112, and translation of the extendable arm 114, a user may move the helmet-mounted display 104 to a desired position relative to the helmet 102.

A user may user may adjust the position of the helmet-mounted display 104 (or other suitable helmet accessory) to a desired position by combining the rotational and/or translational adjustments illustrated in FIGS. 4-6. For example, a user may move the helmet-mounted display straight vertically downwardly relative to the helmet 102 by rotating the ball joint at the first attachment portion 110 along direction G, rotating ball joint at the second attachment portion 112 along direction C, and extending the extendable arm 114 along direction D.

In some embodiments, the first attachment portion is a ball and socket joint which has a range of rotation of up to 30° in a roll rotation. In other embodiments, the ball and socket joint has a range of rotation of up to 45° in a roll rotation. Larger ranges of angles may be provided, and any suitable adjustment range may be provided. In some embodiments, the second attachment portion is a ball and socket joint which has a range of rotation of up to 35° in a yaw rotation. Larger ranges of angles, such as a range of up to 45° may be provided, and any suitable angle adjustment range may be provided.

Figure 7:
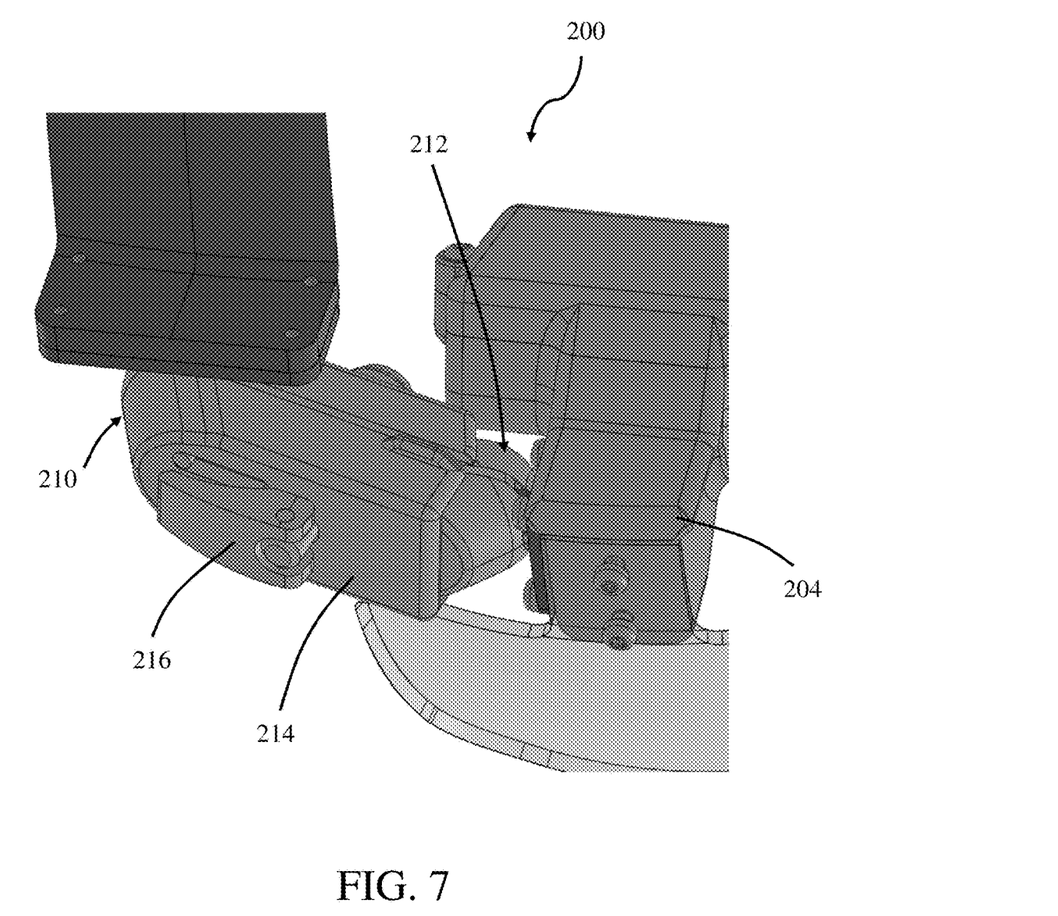
FIG. 7 is a perspective view of a connector according to another embodiment.

FIG. 7 is a perspective view of one embodiment of a connector 200. Similar to the embodiments described above, the connector 200 includes a first attachment portion 210 to attach the connector to a helmet, a second attachment portion 212 to attach a helmet accessory, such as helmet-mounted display unit 204, to the connector, and an extendable arm 214 attached to each of the first and second attachment portions. In the depicted embodiment, the connector 200 includes a locking lever 216 that is movable between a locking position and an unlocking position to selectively move the connector between a locked configuration and an unlocked configuration. Similar to the locking screw discussed above, the locking lever 216 applies a compressive force to the connector components when it is pressed down against the extendable arm (as shown in the figure). Lifting the locking lever releases the compressive force and moves the connector to the unlocked configuration to allow adjustment of the location and/or orientation of the helmet accessory. The locking lever may be a cam lever in some embodiments.

In some embodiments, the connector may be constructed and arranged to allow for rotational adjustment without requiring a user to unlock the connector. For example, the ball joints may be configured to have a level of frictional engagement such that the ball joints are adjustable to a desired rotational position, yet the ball joints are self-supporting and remain in the desired position after adjustment. In such embodiments, unlocking the connector may only unlock translational adjustment of the helmet accessory relative to the helmet.

It should be understood that the current disclosure is not limited to any particular materials for the various components of the connector 100. For example, certain components may be made from any suitable combination of metals, plastics, composite materials, etc. In some embodiments, different components may be made from different materials. For example, the balls 122 and 128 may be made from stainless steel, and the arm portions 150 and 152 may be made from aluminum. In some embodiments, various surface finishes may be applied to surfaces that contact one another in the locked configuration. Various components may be made from plastic, reinforced plastic, or other suitable materials. In other embodiments, all of the components may be made from the same material.

In some embodiments, attaching a helmet accessory to a helmet with a connector also may include electronically attaching the helmet accessory to the helmet. In some embodiments, electrical leads may run along portions of the connector, and the electrical leads may provide power and/or data connectivity between the helmet and the helmet accessory. For example, when a helmet-mounted display is attached to the helmet, the electrical leads may include a video cable to transmit video data from associated electronics on the helmet to the helmet-mounted display.

As noted above, a connector as described herein may be used to adjustably attach any suitable helmet accessory to a helmet. For example, connectors for helmet-mounted displays are described above. Other helmet accessories that may be attached to a helmet with a connector according to the present disclosure include a scope (e.g., a spotting scope), a monocular, binoculars, a light, a camera, a night vision system, or any other suitable accessory that a user may use on the front of a helmet.

A method of adjusting a helmet accessory is disclosed herein. The method includes changing the connector from a locked configuration to an unlocked configuration. Changing the connector to the unlocked configuration may include moving an actuator from a locking position to an unlocking position. When the connector is in the unlocked configuration, a user may adjust the position and/or orientation of the helmet accessory relative to the helmet. Adjusting the position and/or orientation may include extending or retracting an extendable arm, rotating the extendable arm around one or more axes of rotation relative to the helmet, and/or rotating the helmet accessory around one or more axes of rotation relative to the extendable arm. When the helmet accessory is moved to the desired position, the user may change the connector to the locked configuration to substantially prevent subsequent movement of the helmet accessory relative to the helmet. Locking the connector may include moving the actuator to from the unlocking position to the locking position.

A method of manufacturing a helmet having connector for adjustably attaching a helmet accessory to a helmet is also disclosed herein. The method may include providing a helmet, a helmet accessory, and a connector. The method may further include attaching the connector to the helmet at a first attachment portion and attaching the helmet accessory to the connector at a second attachment portion. The first and second attachment portions may be operatively coupled by an extendable arm.

For purposes herein, the terms "connect", "connected", "connection", "couple", "coupled", "attach", "attached" and "attachment" refer to direct connections, couplings, and attachments, indirect connections, couplings, and attachments, and operative connections, couplings, and attachments. For example, bracket 124 is considered to be connected to extendable arm 114, even though the bracket is directly connected to plate 120 which is, in turn, connected to the ball 122 which is received in socket 140 of the extendable arm. Also for purposes herein, the terms "connectable", "attachable", "removable", etc. refer both to components which can be connected, attached, removed, etc., and also refer to components which are connected, attached and removed.

Further, it should be understood that the connectors disclosed herein may be used in applications that do not include helmets. For example, the connector may be used to adjustable attach a camera to a support such as a tripod to allow adjustment of the camera relative to the support.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A connector which permits adjustment of a helmet accessory relative to a helmet, the connector comprising:
   a first attachment portion to attach the connector to a helmet;
   a second attachment portion to attach the connector to a helmet accessory; and an extendable arm that permits translation of the second attachment portion relative to the first attachment portion, wherein the second attachment portion is rotatable around at least two axes of rotation relative to the extendable arm, wherein the connector has a locked configuration and an unlocked configuration, wherein when the connector is in the locked configuration, translation of the second attachment portion relative to the first attachment portion via extension and retraction of the extendable arm is substantially prevented, wherein changing the connector from the locked configuration to the unlocked configuration permits translation of the second attachment portion relative to the first attachment portion, wherein, when the connector is in the locked configuration, rotation of the second attachment portion relative to the extendable arm is substantially prevented, and wherein changing the connector to the unlocked configuration permits rotation of the second attachment portion relative to the extendable arm.

2. The connector of claim 1, wherein the first attachment portion is rotatable around at least three axes of rotation relative to the extendable arm.

3. The connector of claim 1, wherein the extendable arm is rotatable around at least two axes of rotation relative to the first attachment portion, and when the connector is in the locked configuration, rotation of the extendable arm relative to the first attachment portion is substantially prevented, and wherein changing the connector to the unlocked configuration permits rotation of the extendable arm relative to the first attachment portion.

4. The connector of claim 3, wherein the first attachment portion comprises a ball joint.

5. The connector of claim 3, wherein a single actuator is actuated to place the connector in the locked configuration.

6. The connector of claim 1, wherein, when in the locked configuration, rotation of the extendable arm relative to the first attachment portion is substantially prevented, and wherein changing the connector to the unlocked configuration permits rotation of the extendable arm relative to the first attachment portion.

7. The connector of claim 6, wherein the extendable arm is rotatable around at least three axes of rotation relative to the first attachment portion.

8. The connector of claim 1, wherein the second attachment portion comprises a ball joint.

9. The connector of claim 1, wherein the second attachment portion translates relative to the first attachment point by extension and retraction of the extendable arm.

10. The connector of claim 1, wherein the connector includes a single actuator which is actuable to change the configuration of the connector between the locked configuration and the unlocked configuration.

11. The connector of claim 10, wherein the actuator comprises a screw.

12. The connector of claim 1, wherein the second attachment portion removably attaches the connector to the helmet accessory.

13. A connector which permits adjustment of a helmet accessory relative to a helmet, the connector comprising:
a first attachment portion to attach the connector to a helmet;
a second attachment portion to attach the connector to a helmet accessory;
an extendable arm coupled to the first attachment portion and the second attachment portion, wherein the extendable arm is constructed and arranged to permit translation of the second attachment portion relative to the first attachment portion;
a first joint coupled to the first attachment portion, wherein the first joint permits rotation of the extendable arm relative to the first attachment portion around at least two axes of rotation;
a second joint coupled to the second attachment portion, wherein the second joint permits rotation of the second attachment portion relative to the extendable arm around at least two axes of rotation; and
a lock which is movable between a locking configuration and an unlocking configuration, wherein, in the locking configuration, the lock substantially prevents rotational and translational movement of the second attachment portion relative to the first attachment portion.

14. The connector of claim 13, wherein the first joint permits rotation of the extendable arm relative to the first attachment portion around at least three axes of rotation.

15. The connector of claim 13 wherein the second joint permits rotation of the second attachment portion relative to the extendable arm around three axes of rotation.

16. The connector of claim 15, wherein the first arm portion includes a channel adapted to receive the second arm portion, and wherein the second arm portion is slidable within the channel.

17. The connector of claim 16, wherein the first joint is a first ball joint.

18. The connector of claim 13, wherein the extendable arm comprises a first arm portion and a second arm portion slidable relative to the first arm portion.

19. The connector of claim 13, wherein moving the lock to the locking position applies a compressive force to at least a portion of the connector, and wherein the compressive force provides a frictional engagement that substantially prevents movement of the second attachment portion relative to the first attachment portion.

20. The connector of claim 13, further comprising an actuator coupled to the lock.

21. The connector of claim 20, wherein the actuator permits at least one of extension or retraction of the extendable arm, rotation of the first ball joint, and rotation of the second ball joint when the actuator is in the unlocked position.

22. A connector which permits adjustment of a helmet accessory relative to a helmet, the connector comprising:
a first attachment portion to attach the connector to a helmet;
a second attachment portion to attach the connector to a helmet accessory;
a means for adjusting the position of the second attachment portion relative to the first attachment portion; and
a means for selectively permitting and preventing rotational and translational adjustment of the position of the second attachment portion relative to the first attachment portion.

23. The connector of claim 22, wherein the means for selectively permitting and preventing adjustment selectively permits and prevents rotation of the first attachment portion relative to the helmet and translation and rotation of the second attachment portion relative to the first attachment portion.

24. The connector of claim 23, wherein the means for selectively permitting and preventing adjustment comprises a single actuator that selectively permits and prevents rotation of the first attachment portion relative to the helmet and translation and rotation of the second attachment portion relative to the first attachment portion.

\* \* \* \* \*